(12) United States Patent
Deoka et al.

(10) Patent No.: US 7,154,420 B2
(45) Date of Patent: Dec. 26, 2006

(54) IMAGE CODING APPARATUS AND METHOD THEREOF AND CODED IMAGE DECODING APPARATUS AND METHOD THEREOF

(75) Inventors: Yoshihiko Deoka, Tokyo (JP); Hideya Muraoka, Tokyo (JP)

(73) Assignee: Sony Corporation (JP)

( * ) Notice: Subject to any disclaimer, the term of this patent is extended or adjusted under 35 U.S.C. 154(b) by 202 days.

(21) Appl. No.: 10/503,957

(22) PCT Filed: Dec. 11, 2003

(86) PCT No.: PCT/JP03/15895

§ 371 (c)(1), (2), (4) Date: Jan. 10, 2005

(87) PCT Pub. No.: WO2004/056085

PCT Pub. Date: Jul. 1, 2004

(65) Prior Publication Data

US 2006/0214819 A1  Sep. 28, 2006

(30) Foreign Application Priority Data

Dec. 16, 2002 (JP) ............... 2002-364288

(51) Int. Cl.
*H03M 7/46* (2006.01)
*H04N 1/419* (2006.01)

(52) U.S. Cl. ............ 341/63; 382/245; 358/426.13

(58) Field of Classification Search ............ 341/63; 358/423.13; 382/166, 239, 245

See application file for complete search history.

(56) References Cited

U.S. PATENT DOCUMENTS 4,914,508 A * 4/1990 Music et al. ............ 375/240.01
5,028,991 A * 7/1991 Sekizawa et al. ............ 358/537

* cited by examiner

Primary Examiner—Howard L. Williams
(74) Attorney, Agent, or Firm—Lerner, David, Littenberg, Krumholz & Mentlik, LLP (57) ABSTRACT

In order to decrease a required memory capacity of a line memory and to efficiently compress an image by coding, even when character information is contained in a high-resolution image, each time the block of an image that is equally divided into M (M: an arbitrary integer greater than 1) blocks in the horizontal direction is updated, difference data between color code data at corresponding pixel positions in the horizontal line and the adjacent immediately-preceding horizontal line with respect to each horizontal line within the block is detected by a line memory and an exclusive-OR circuit. After a run has been detected from the difference data corresponding to the horizontal lines from the exclusive-OR circuit by a run end detecting circuit, when a coded word is run-length coded by a code creating and outputting circuit, a coded word corresponding to a first run is run-length coded in the state in which information of difference data of the run is contained in this coded word and coded words corresponding to runs other than the first run are run-length coded in the state in which transition type information, indicative of the type of transition of the difference data of the immediately-preceding run to the difference data of the run is contained in the coded words.

8 Claims, 7 Drawing Sheets

FIG. 3

| D(k-1) \ D(k) | 00 | 01 | 10 | 11 |
|---|---|---|---|---|
| 00 |  | 0 | 10 | 11 |
| 01 | 0 |  | 10 | 11 |
| 10 | 0 | 10 |  | 11 |
| 11 | 0 | 10 | 11 |  |

$T(k): D(k-1) \rightarrow D(k)$

IMAGE CODING APPARATUS AND METHOD THEREOF AND CODED IMAGE DECODING APPARATUS AND METHOD THEREOF

This application is a 371 of PCT/JP03/15895 filed 11 Dec. 2003.

TECHNICAL FIELD

The present invention relates to an image coding apparatus and a method thereof for efficiently run-length coding image data in which color code data are associated with respective pixels of a image with high resolution, and further relates to a coded image decoding apparatus and a method thereof for decoding the coded image data.

BACKGROUND ART

When character information such as superimposition, the words, a liner note (liner note: information and comments about the music or the performer that, in most cases, comes with a package of a CD and a record or is printed on the cover of a record) and titles are displayed together with a moving picture such as a movie and a still picture such as a scenery, a portrait and a still life, it is customary that a moving picture and a still picture are natural images, and hence it is desired that they should be compressed and stored in advance by a compression method such as a JPEG (Joint Photographic Expert Group) which is a color still image compression system and an MPEG (Moving Picture Expert Group) which is a color moving image compression system. However, since it is customary to create character information artificially and the kinds of colors that can be used with character information are less, in most cases, character information is generally stored in the state in which it is compressed by run-length coding that is advantageous for compressing character information.

In other words, when character information such as superimposition of a movie and the words of music and liner notes is displayed on a display apparatus such as a television receiver and the like from a disc apparatus or the like as a still picture, character information is recorded on a storage medium such as a disc in the state in which it is compressed in advance by run-length coding.

For example, if a characters is colored white, the edges of the character are colored two colors of black and red and other remaining ground portion is colored transparent color, white, black, red and transparent color are expressed by binary numbers of "11", "10", "01", "00" and any one of binary numbers corresponds to each pixel on a picture, an image containing the character information can be created easily. In that case, these binary numbers "11", "10", "01", "00" are called color code data. A correspondence between actual color data expressed by YCbCr-system and the like and color code data is called a palette.

Figure 8:
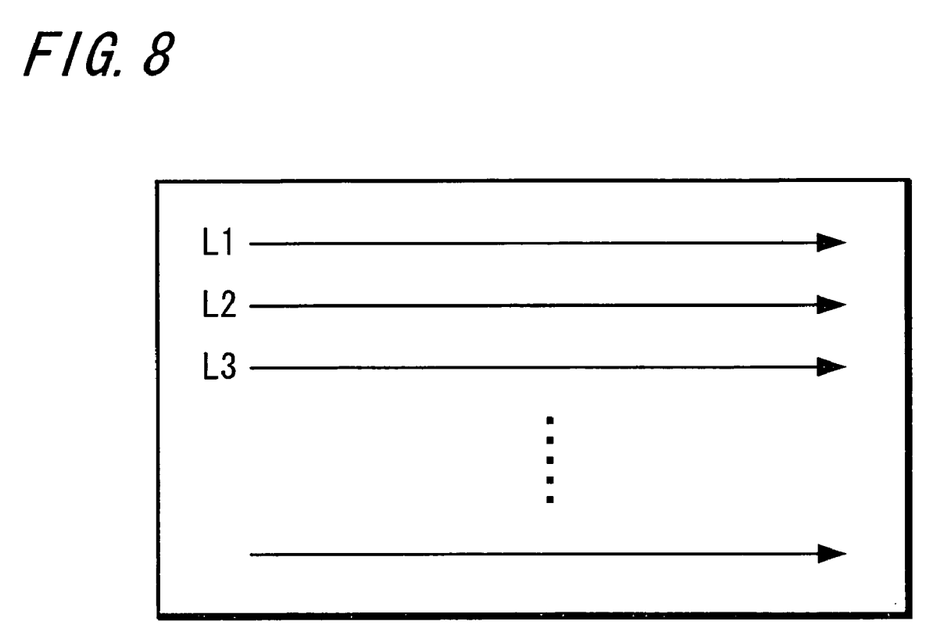
FIG. 8 is a diagram used to explain a manner in which data are compressed by run-length coding on respective horizontal lines.

In the run-length coding, as shown in FIG. 8, first, color code data of respective pixels on a horizontal line are sequentially examined from left to right on a horizontal (scanning) line L1 and the number in which the same color code data are continued is run-length-coded. Thereafter, with respect to horizontal lines L2, L3, . . . , the numbers in which the same color code data are continued are examined and the resultant number are run-length-coded.

In the case of the above-mentioned run-length coding on the horizontal direction, that is, when the same color code data are continued long in the horizontal direction, although a compression rate with respect to the line of the lateral direction of the characters is increased, correlation caused by a thickness of the line of the longitudinal direction and a thickness of the line of the lateral direction of the character is not utilized.

Figure 9:
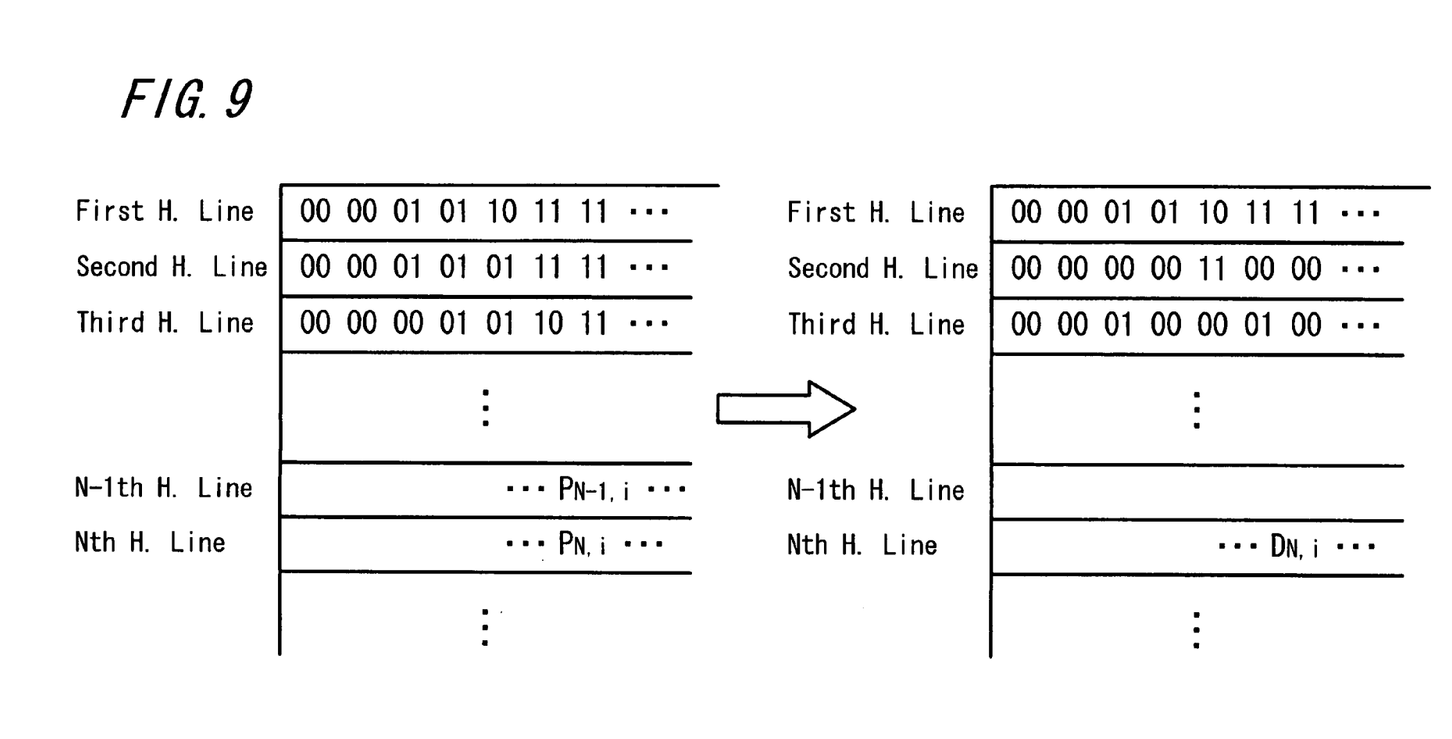
FIG. 9 is a diagram used to explain a manner in which differential data are compressed by run-length coding on respective horizontal lines.

As a method of using a correlation in the vertical direction with ease, when data of Nth horizontal line (N=2, 3, 4, . . . ) from above is compressed by run-length coding, the color code data of each pixel on this horizontal line is not directly compressed by run-length coding but a difference between it and the color code data of each pixel on N−1th horizontal line which is the immediately-preceding adjacent horizontal line may be calculated and the number in which the same difference data is continued may be compressed by run-length coding (differential run-length coding compression). To be concrete, as shown in FIG. 9, assuming that color code data of i-th pixel (i=1, 2, 3, . . . ) from the left on the N−1-th horizontal line is $P_{N-1, i}$, then difference data $D_{N, i}$ in the i-th pixel from left is calculated as $D_{N, i} = P_{N, i} \wedge P_{N,i}$. In this manner, the difference data on the N−1−th horizontal line is calculated and is compressed by run-length coding. In this connection, in the above-described equation, the symbol $\wedge$ represents an exclusive-OR calculation. With respect to 1st horizontal line (N=1), the color code data of each pixel on that horizontal line is directly compressed by run-length coding.

In this connection, as the cited patent reference concerning this kind of technology, there may be enumerated Official Gazette of Japanese laid-open patent application 64-7715 published by Japan Patent Office. This Official Gazette of Japanese laid-open patent application No. 64-7715 has described the technology in which not only difference data on the main scanning direction but also difference data on the sub-scanning direction is calculated.

When it is assumed that an image is to be displayed by a high-resolution display apparatus such as an HDTV (High Definition TV), if the number of pixels per picture is composed of 1920 pixels in the horizontal direction and 1080 pixels in the vertical direction, then a memory capacity of a line memory (for example, shift register) necessary for a differential run-length coding compression process of character information image and its decoding expansion process requires 1920×2 bits indeed. In other words, even in the high-resolution image, the memory capacity of the line memory should be decreased and the character information image should be compressed by the differential run-length coding process and expanded by a decoding process.

It is an object of the present invention to provide an image coding apparatus in which, even when a high-resolution image contains character information, a memory capacity of a line memory can be decreased and in which an image can be efficiently coded and compressed.

It is other object of the present invention to provide an image coding method in which, even when a high-resolution image contains character information, an image can be coded and compressed economically and efficiently.

It is a further object of the present invention to provide a coded image decoding apparatus in which, even when a high-resolution image contains character information, an efficiently-coded and-compressed image can be decoded and expanded by a line memory with a decreased memory capacity.

It is yet a further object of the present invention to provide a coded image decoding method in which, even when a high-resolution image contains character information, an efficiently-coded and-compressed image can be decoded and expanded economically.

DISCLOSURE OF THE INVENTION

According to the first invention, there is provided an image coding apparatus for an image in which color code data of 2 bits correspond to each pixel on an image. This image coding apparatus is comprised of a color code difference detecting means for detecting difference data between color code data of opposing pixel positions in divided horizontal lines and adjacent immediately-preceding divided lines with respect to each of divided horizontal lines within blocks each time blocks of an image equally divided into M (M: an arbitrary integer greater than 1) blocks in the horizontal direction are updated and run-length coding means for run-length coding a coded word corresponding to a first run in the state in which the run contains difference information except when the run is a special run and coded words corresponding to runs other than the first run in the state in which the run contains transition type information indicating the type of transition of difference data of an immediately-preceding run to the difference of the run instead of difference information of the run except when the run is a special run each time difference data corresponding to a divided horizontal line from the color code difference detecting means is run-length coded at every run.

According to this arrangement, it is possible to provide an image coding apparatus in which a memory capacity of a line memory can be decreased and in which an image can efficiently be compressed by coding even when character information is contained in a high-resolution image.

According to the second invention, in the image coding apparatus according to the first invention, the run-length coding means run-length codes a special run in which a coded word corresponding to a run having a length of 1 is set to a shortest constant word length and in which all difference data on divided horizontal lines are continued from a certain pixel position to an end pixel position in the form of "00" and a run in which a special coded word corresponding to the special run is set to a constant word length which does not contain difference information and in which all difference data on the divided horizontal lines are continued from a certain pixel position to an end pixel position in the form other than "00" and are the same, while the run length coding means run-length codes runs other than the first run and the special run in the state in which transition type information is set to 1 bit when the difference data of the immediately-preceding run changes into the difference data "00" of the run and the run-length coding means run-length codes runs in the state in which transition type information is set to 2 bits when the difference data of the immediately-preceding run changes into other difference data than the difference "00".

According to this arrangement, the image can be compressed by coding more efficiently.

According to the third invention, there is provided an image coding method for an image in which color code data of 2 bits corresponds to each pixel on an image. This image coding method is comprised of the steps of a color code difference detecting step for detecting difference data between color code data of opposing pixel positions in divided horizontal lines and adjacent immediately-preceding divided lines with respect to each of divided horizontal lines within blocks each time blocks of an image equally divided into M (M: an arbitrary integer greater than 1) blocks in the horizontal direction are updated and a run-length coding step for run-length coding a coded word corresponding to a first run in the state in which the run contains difference information except when the run is a special run and coded words corresponding to runs other than the first run in the state in which the run contains transition type information indicating type of transition of difference data of an immediately-preceding run to the difference data of the run instead of difference information of the run except when the run is a special run each time difference data corresponding to a divided horizontal line from the color code difference detecting means is run-length coded at every run.

According to this arrangement, it is possible to provide an image coding method in which an image can be compressed by coding economically and efficiently even when character information is contained in a high-resolution image.

According to the fourth invention, in the image coding method according to the third invention, the run-length coding method run-length codes a special run in which a coded word corresponding to a run having a length of 1 is set to a shortest constant word length and in which all difference data on divided horizontal lines are continued from a certain pixel position to an end pixel position in the form of "00" and a run in which a special coded word corresponding to the special run is set to a constant word length which does not contain difference information and in which al difference data on the divided horizontal lines are continued from a certain pixel position to an end pixel position in the form other than "00" and are the same, while the run length coding method run-length codes runs other than the first run and the special run in the state in which transition type information is set to 1 bit when the difference data of the immediately-preceding run changes into the difference data "00" of the run and the run-length coding means run-length codes runs in the state in which transition type information is set to 2 bits when the difference data of the immediately-preceding run changes into other difference data than the difference "00".

According to this arrangement, the image can be compressed by coding more efficiently.

According to the fifth invention, there is provided a coded image decoding apparatus for a coded image run-length coded in which color code data of 2 bits corresponds to each pixel on an image, a color code difference detecting step for detecting difference data between color code data of opposing pixel positions in divided horizontal lines and adjacent immediately-preceding divided lines with respect to each of divided horizontal lines within blocks is detected each time blocks of an image equally divided into M (M: an arbitrary integer greater than 1) blocks in the horizontal direction are updated and a coded word corresponding to a first run is run-length coded in the state in which the run contains difference information except when the run is a special run and coded words corresponding to runs other than the first run in the state in which the run contains transition type information indicating type of transition of difference data of an immediately-preceding run to the difference data of the run instead of difference information of the run except when the run is a special run each time difference data corresponding to a divided horizontal line from the color code difference detecting means is run-length-coded at every run. This coded image decoding apparatus is comprised of a coded word extracting means for sequentially extracting a coded word from a coded word string corresponding to divided horizontal lines sequentially inputted from the outside and a decoding means for decoding the coded word extracted by the coded word extracting means.

According to this arrangement, it is possible to provide a coded image decoding apparatus in which an efficiently-coded and-compressed image can be expanded by decoding with the memory capacity of the line memory being decreased even when character information is contained in the high-resolution image.

According to the sixth invention, in the coded image decoding apparatus according to the fifth invention, the decoding means decodes information of difference data corresponding to the coded word based on transition type information contained in the coded word and information of difference data corresponding to an immediately-preceding coded word when coded words other than specific coded words corresponding to a first coded word of a divided horizontal line and a special run are decoded.

With this arrangement, the efficiently-coded and-compressed image can be expanded by decoding more efficiently.

According to the seventh invention, there is provided a coded image decoding method for a coded image run-length coded in which color code data of 2 bits corresponds to each pixel on an image, a color code difference detecting step for detecting difference data between color code data of opposing pixel positions in divided horizontal lines and adjacent immediately-preceding divided lines with respect to each of divided horizontal lines within blocks is detected each time blocks of an image equally divided into M (M: an arbitrary integer greater than 1) blocks in the horizontal direction are updated and a coded word corresponding to a first run is run-length coded in the state in which said run contains difference information except when the run is a special run and coded words corresponding to runs other than the first run in the state in which said run contains transition type information indicating type of transition of difference data of an immediately-preceding run to the difference data of the run instead of difference information of the run except when the run is a special run each time difference data corresponding to a divided horizontal line from the color code difference detecting means is run-length coded at every run. This coded image decoding method is comprised of the steps of a coded word extracting step for sequentially extracting a coded word from a coded word string corresponding to divided horizontal lines sequentially inputted from the outside and a decoding step for decoding the coded word extracted by the coded word extracting step.

According to this arrangement, it is possible to provide a coded image decoding method in which an efficiently-coded and-compressed image can be economically expanded by decoding even when character information is contained in the high-resolution image.

According to the eighth invention, in the coded image decoding method according to the seventh invention, the decoding step decodes information of difference data corresponding to the coded word based on transition type information contained in the coded word and information of difference data corresponding to an immediately-preceding coded word when coded words other than specific coded words corresponding to a first coded word of a divided horizontal line and a special run are decoded.

According to this arrangement, the efficiently-coded image can be expanded by decoding more effectively.

BEST MODE FOR CARRYING OUT THE INVENTION

An embodiment according to the present invention will be described below with reference to FIGS. 1 to 7. Also in this embodiment, a character is colored white, the edges of the character are colored two colors of black and red, and other ground portion is colored transparent color. These white, black, red and transparent colors are respectively expressed by binary numbers "11", "10", "01", "00" as the color codes and any one of the binary numbers corresponds to each pixel on one picture, thereby constructing an image containing character information.

First, it is considered that one picture is equally divided into the (original) horizontal line in order to decrease the memory capacity of the line memory. In the example shown in FIG. 1, since the (original) horizontal line of 1920 pixels on the (original) horizontal line is equally divided by 15, one picture is divided into 15 blocks. As a result, if the difference data is sequentially compressed by differential run-length coding at the horizontal line unit (hereinafter simply referred to as a "horizontal line" until otherwise specified) within each block after the horizontal line has been divided into the blocks instead of compressing the difference data on the (original) horizontal line by differential run-length coding, then the memory capacity of the line memory can be decreased to 1/15, that is, 128×2 bits.

Figure 1:
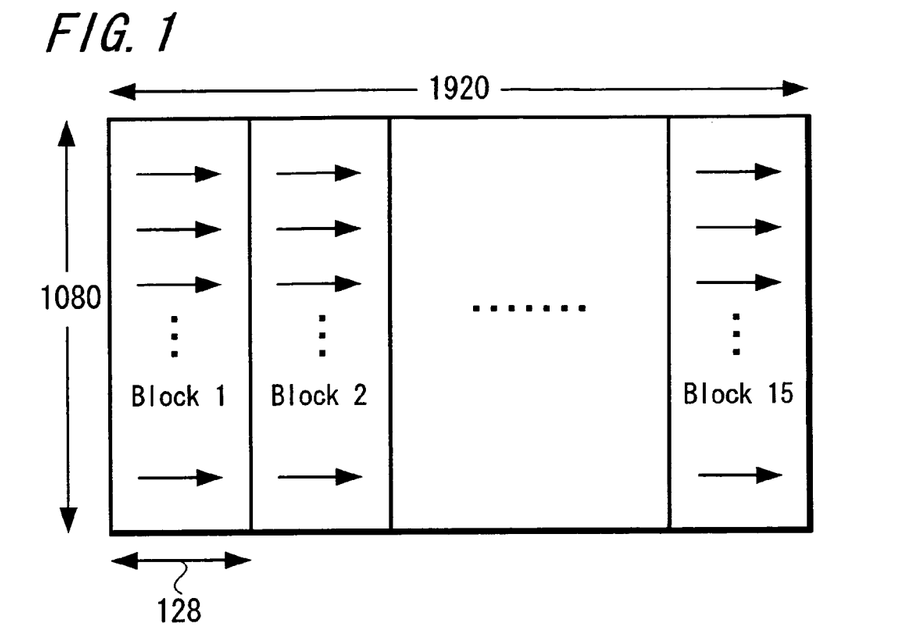
FIG. 1 is a diagram used to explain the manner in which one picture is divided into blocks in the horizontal direction in order to decrease a memory capacity of a differential run-length coding compression/coding expansion line memory.
Figure 2:
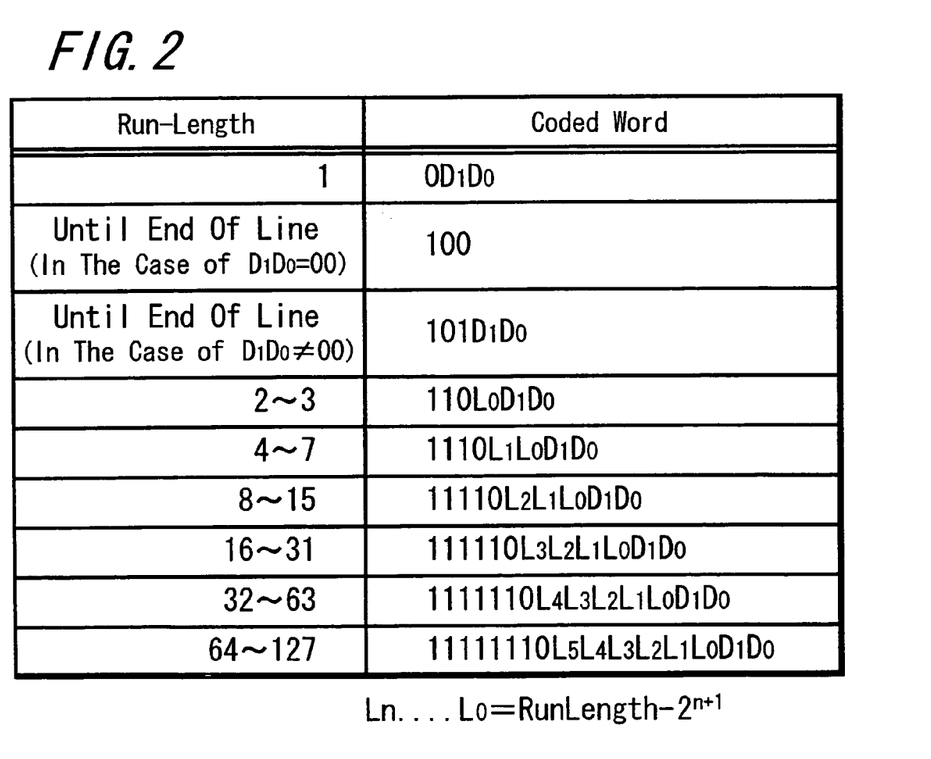
FIG. 2 is a diagram showing a correspondence relationship between run-lengths and examples of coded words in the form of a code book according to the present invention.

As described above, the difference data is compressed by differential run-length coding at the horizontal line unit. A correspondence relationship between the run-length and the coded word (code) will be described. FIG. 2 shows an example of the correspondence relationship in the form of a code book. When difference data between the horizontal line and the immediately-preceding adjacent horizontal line is compressed by differential run-length coding, although not described in detail, as shown in the figure, since it is customary that a frequency at which a run-length having a length of 1 appears becomes maximum, a coded word (containing information of difference data $D_1 D_0$) for the run-length having the length of 1 is set to be a shortest constant word length. The reason for this is that if a short coded word is set as the frequency increases, then a compression rate can be improved more from a run-length coding standpoint.

Also, although a special run-length in which the same difference data "00" continues from a certain pixel position (containing the first pixel position) to the end pixel position appears with high frequency, since it is not advantageous that a specific coded word relative to a special run-length (corresponding to Until End Of Line of $D_1D_0$=00) of which difference data is "00" and a special coded word relative to a run-length (corresponding to Until End Of Line of $D_1D_0$≠00) in which the difference data continues from a certain pixel position (containing first pixel position) to the end pixel position are set to be the same word length, a special coded word (composed of only an initial code 100 corresponding to the special run is set to be shorter than a specific coded word (composed of the initial code 100 and the information of the difference data $D_1D_0$). The reason for this is the same as that of the previously-described case. That is, if the shorter coded word is set as the frequency is increased, then it is possible to increase the compression rate from a run-length coding standpoint.

In this embodiment, the coded word for the run having the length of 1 is set to be 3 bits, the specific coded word for the special run having the difference data "00" is set to be 3 bits and the specific coded word having the difference data other than the difference data "00" and of which same difference data is continued from a certain pixel position to the final pixel position. Also, a coded word corresponding to a run other than the above-described run is composed of the initial code, the run-length information and the information of the difference data $D_1D_0$. Although coded words having run-lengths 4 to 7 are set to "$1110L_1L_0D_1D_0$", $L_1L_0$="00", "01", "10", "11" correspond to run-lengths 4, 5, 6, 7, respectively. In this connection, it is customary to construct the initial code as a bit pattern string composed of 0 and 1.

In conclusion, when data is compressed by differential run-length coding at the horizontal line unit, the maximum run-length is 128 so that any run-length can be coded reliably by using the code book shown in FIG. 2. In other words, information can be coded without using the coded word with the same information of the difference data $D_1D_0$. In this connection, it is assumed that the specific coded word corresponding to Until End Of Line of $D_1D_0$="00" and the coded word corresponding to Until End Of Line of $D_1D_0$≠"00" are used when the same difference data is continued from the first pixel position of the horizontal line to the final pixel position. However, when the same difference data is continued from somewhere of the pixel position to the final pixel position other than the first pixel position. In other words, when the same difference data is continued from somewhere of the pixel position to the final pixel position other than the first pixel position, it is advantageous to use a specific coded word having a short word length.

As described above, the coded word in which the information of the difference data $D_1D_0$ is the same can be prevented from being used continuously within any horizontal line. That is, D(k) assumes information of the difference data $D_1D_0$ contained in k-th coded word (k=0, 1, 2 ...) within the horizontal line. If k≧1, then D(k)≠D(k−1). In a transition Tk) from D(k−1) to D(k), as shown on a transition table of FIG. 3, three types are provided for four kinds of difference data of D(k−1). Accordingly, it may be considered that only when k≧1, T(k) (T(k)="0", "10" or "11") is used as tran instead of information of 2-bit fixed length difference data $D_1D_0$ and that when k=0, that is, the information of the difference data $D_1D_0$ may be contained in the first coded word within the horizontal line.

Figure 3:
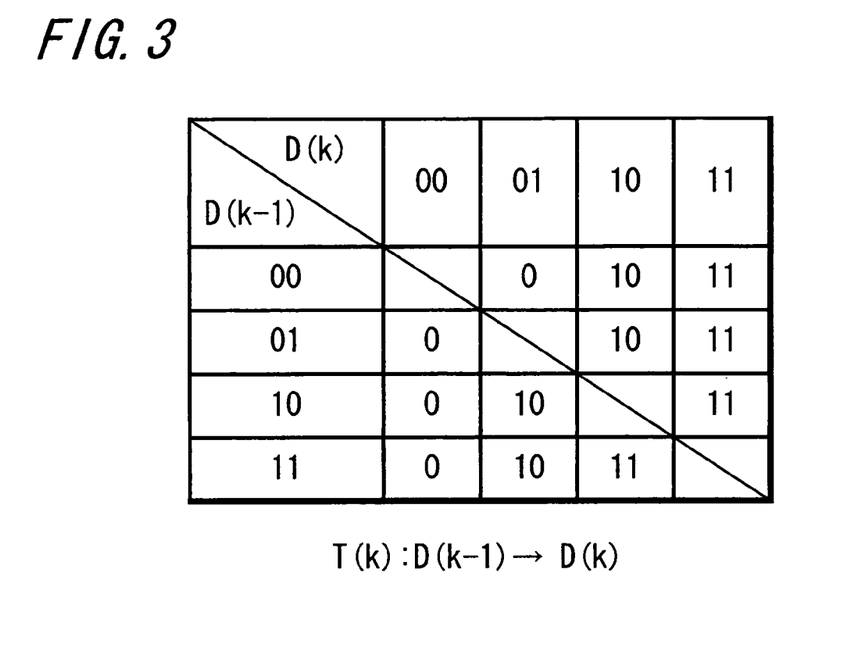
FIG. 3 is a diagram showing a relationship between a transition manner of difference information between successive two coded words and transition type information in the form of a transition table.

In general, once the difference data Until End of Line has been changed into other difference data than the difference data "00", the frequency at which the difference data $D_1D_0$ returns to the difference data "00" in the next run tends to become larger than the frequency at which it changes into other difference data than the difference data "00". Since not the color code data but the changed data of the difference data of the color coded data is coded, this tendency does not depend upon the way of how to make the afore-mentioned palette. Accordingly, as transition type information T(k) corresponding to the transition from D(k) which is not "00" to D(k)="00", the initial code "0" having a short bit length is advantageous from a coding compression standpoint. When transition type information is used in addition to the coded words prepared on the code book, it is to be understood that coding compressed data amount could be reduced by approximately 10% typically as compared with the case in which only the code book is in use.

In this connection, when the specific coded word corresponding to Until End Of Line of $D_1D_0$ is used in the run following the second run within the horizontal line in the coding compression using the above-mentioned transition type information T(k), since the specific coded word does not contain the difference information, the transition type information T(k) is not generated and its specific coded word "100" is used as it is.

According to the code book shown in FIG. 2, since the length of the run-length is 128 at maximum, data is compressed by differential run-length coding within this range. If the coded words are set to the code book such that the length of the run-length becomes 1920 at maximum, then it is clear that the (original) horizontal line need not be divided equally.

Although the following arrangement departs from the gist of the present invention, according to the present invention, even when the length of the run-length is longer than 129, data can be compressed by differential run-length coding using only the coded words shown in FIG. 2. For example, of the coded words prepared on the code book, Cm assumes the coded word having the longest run-length (except the coded word corresponding to Until End Of Line) and Rm assumes the run-length expressed by Cm. Then, when the run R longer than the run length Rm is coded, it is customary that a relationship expressed by R=(Rm+Rm+ . . . +Rm+Rm)+Rr=Rm×Q+Rr is established between the coded word and the run-length where Rr<Rm is satisfied. Accordingly, after coded word Cm has been repeated Q times, the coded word corresponding to the remaining Rr may be used. In this case, although the run with the same difference information is continued, if there is provided an exceptional rule in which transition type information is not used instead of the difference information $D_1D_0$ but the coded word following the coded word Cm contains the difference information $D_1D_0$ as it is, then data can be coded even when K≧1 and D(k)=D(k−1).

Figure 4:
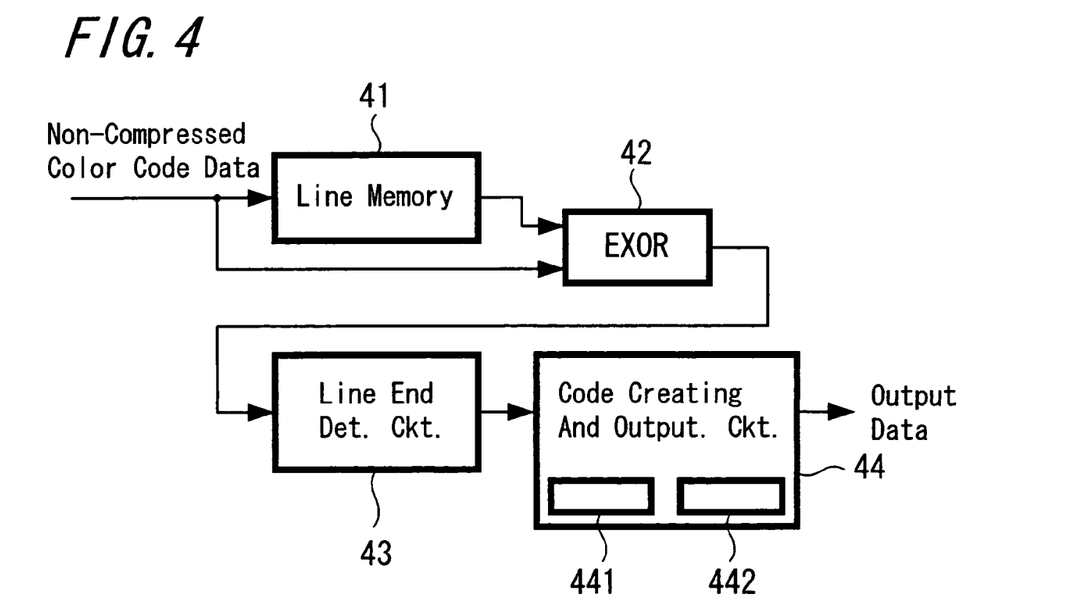
FIG. 4 is a block diagram showing an example of an image coding apparatus according to the present invention.

The theoretical background of the differential run-length coding compression according to the present invention has been described so far. Next, an image coding apparatus and the like according to the present invention will be described in concrete. FIG. 4 is a block diagram showing an arrangement of an image coding apparatus. The arrangement and operation s of this image coding apparatus will be described with reference to FIG. 1. First, in the state in which a line memory (generally constructed as a shift register and its memory capacity is 128×2 bits, for example) 41 is reset, (non-compressed) color code data on the first horizontal line within the block 1 is inputted to the line memory as serial data. While the color code data is sequentially shifted in the line memory 41, the color code data is exclusive-ORed with data "0" sequentially shifted out from the line memory 41 by an exclusive-OR circuit 42. As a result, difference data relative to color code data on the first horizontal line is obtained as its color code data and that color code data is stored in the line memory 41.

Next, color code data on the second horizontal line within the block 1 is inputted to the line memory as serial data. While the color code data is sequentially shifted in the line memory 41, such color code data is exclusive-ORed with the color code data on the first horizontal line sequentially shifted out from the line memory 41 by the exclusive-OR circuit 42. As a result, difference data for color code data on the second horizontal line is obtained as a result of its exclusive-OR calculation, and the color code data on the second horizontal line is stored in the line memory 41. Although similar processing is repeated in color code data on the horizontal lines following the third horizontal line, at the time in which processing on the color code data on the last horizontal line is ended, the line memory 41 is rest temporarily. Then, similar processing to that executed on the color code data within the block 1 will be sequentially executed on color code data on respective horizontal lines within a block 2. In this manner, similar processing is repeated on color code data from the blocks 1 to 15 and thereby difference data of color code data are detected.

Concurrently with the above-mentioned difference data detection, difference data from the exclusive-OR circuit 42 is inputted to a run end detecting circuit 43 as serial data and in which the end of the run is detected from the discontinuous position of the same difference data. When the end of the run is detected, an interval of 128×2 bits is used as one data interval and run end detection processing is carried out at every data interval. Each time the run is detected within the data interval, the detected run is supplied to a code creating and outputting circuit 44, in which it is converted into a corresponding code (code) based upon a code book 441 and a transition table 442 (refer to only the code book 441 when the first run of the horizontal line and the specific code for Until End Of Line of $D_1D_0$="00" are used), and compressed and stored in a recording medium such as a disc together with moving picture data and still image data. In this connection, even when the run lies across two data intervals, such run can be separated forcibly in somewhere of its portion and each divided run is coded.

Figure 5:
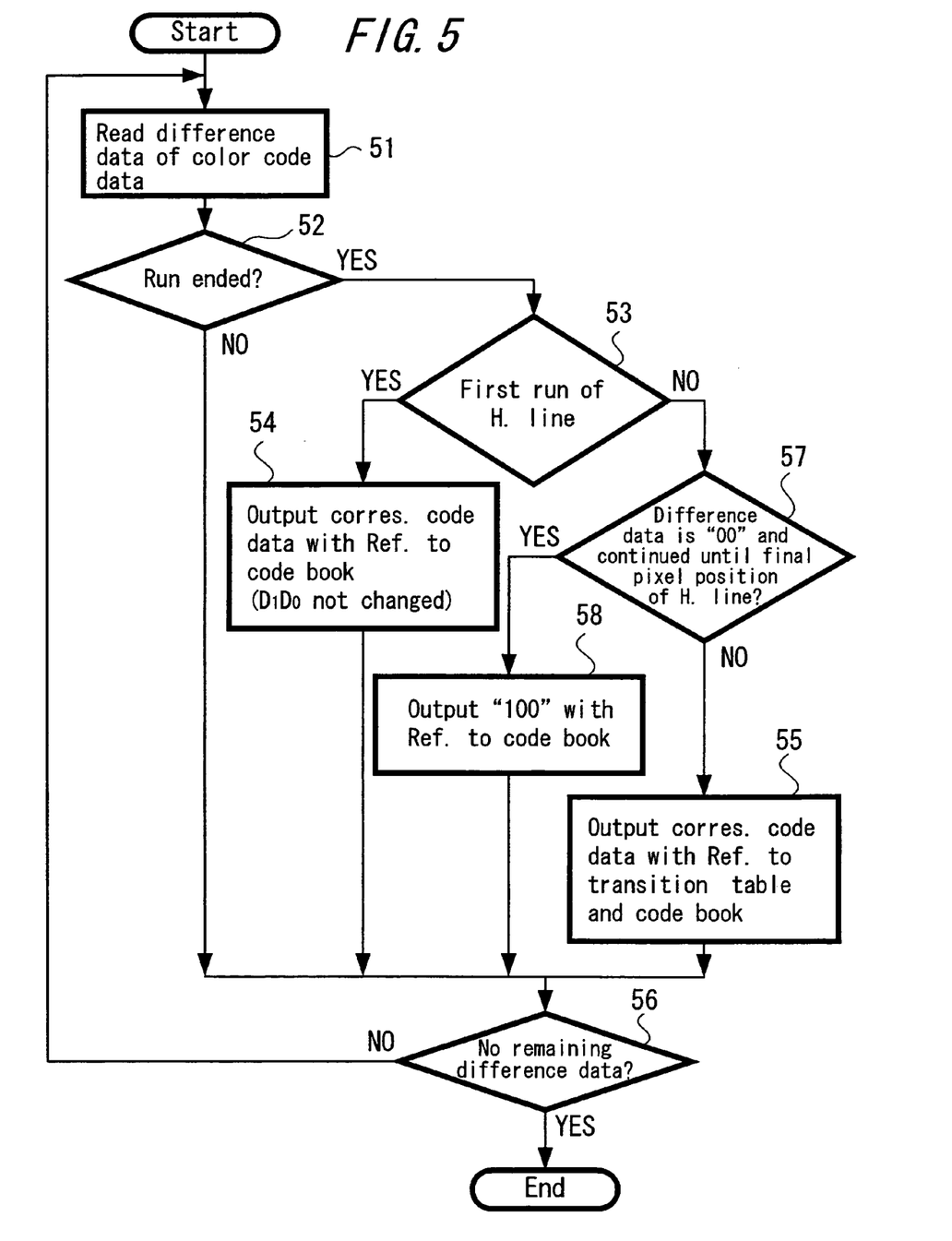
FIG. 5 is a flowchart showing an example of coding processing in the image coding apparatus according to the present invention.

FIG. 5 is a flowchart showing an example of differential run-length coding processing done by software processing executed at the horizontal line unit, that is, at the unit in which the interval of 128×2 bits is set to one data interval on the assumption that difference data for each horizontal line has already been obtained or will be obtained sequentially. As illustrated, first, each time a series of difference data on the first horizontal line within the block 1 read out from the leading bit, it is determined whether or not the run is ended (whether or not the same difference data is continued) (steps 51, 52). If the same difference data is not continued and the run is ended, then it is determined whether or not the run is the first run of the horizontal line (steps 52, 53). If it is the first run, then the run is converted and outputted as a corresponding code with reference to the code book based upon the difference information and the run-length (steps 53, 54). If it is determined that the above run is not the first run, then it is determined whether or not the difference informa-tion of the run is "00" and continued to the final pixel position of the horizontal line, that is, whether or not the run can be coded by Until End Of Line of $D_1D_0$="00" (step 57). If the run can be coded by Until End Of Line of $D_1D_0$, then such run is converted and outputted as its specific code (step 58). If it is determined that that run cannot be coded by Until End Of Line of $D_1D_0$="00", then such run is converted and outputted as a corresponding code with reference to the transition table (steps 53, 55).

After that, it is determined whether or not difference data, which are not yet read, on the horizontal line exist. If there exist difference data which are not yet read, then control goes back to the step 51 and if not, then a series of steps is ended (step 56). The above coding processing will be repeated on up to the last horizontal line within the block 15.

Figure 6:
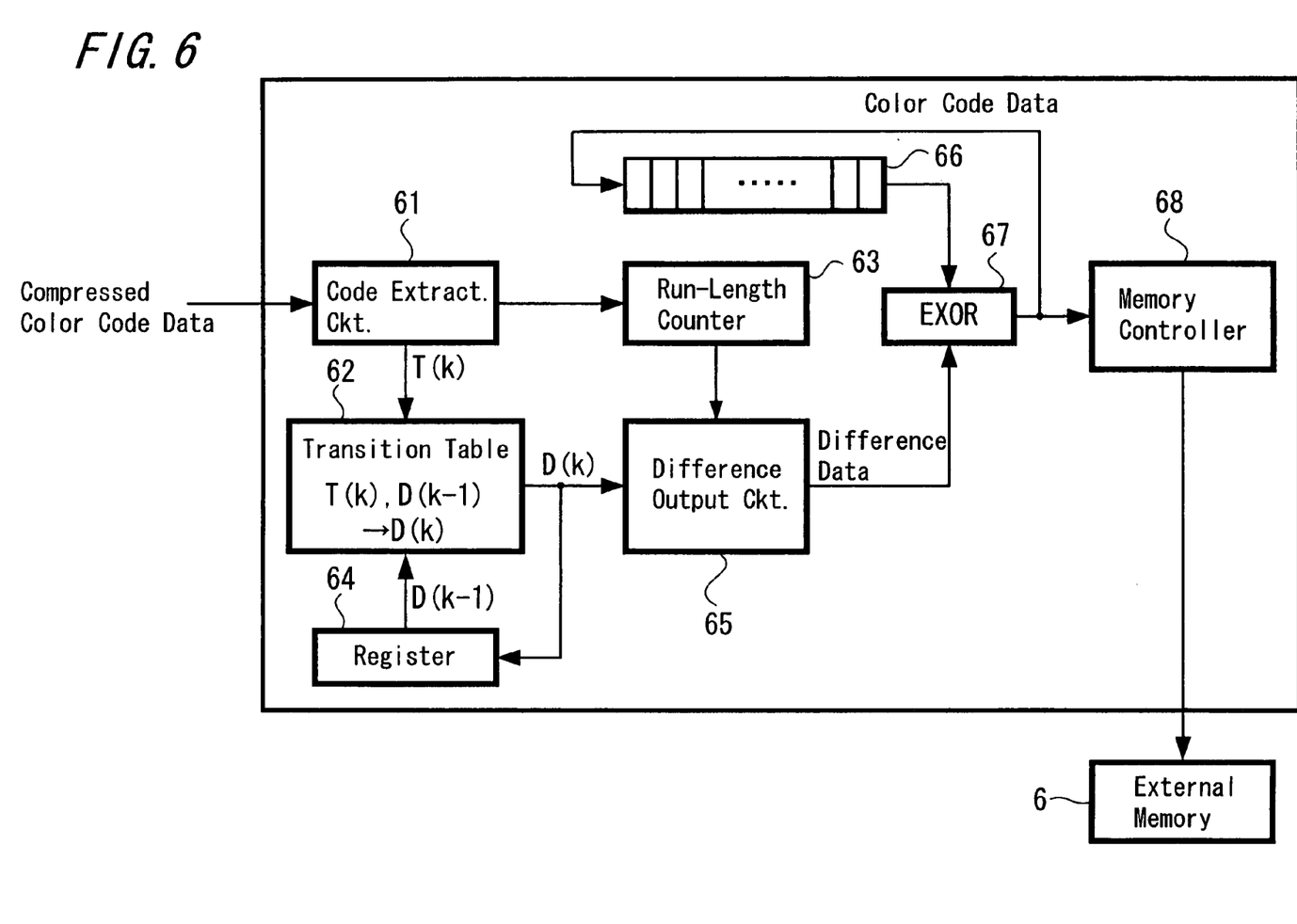
FIG. 6 is a block diagram showing an example of a coded image decoding apparatus according to the present invention.

As described above, image data containing character information is coded and compressed by the coding compression method according to the present invention and stored in the recording medium such as the disc together with moving picture data and still image data. When a moving picture or a still image is reproduced and displayed, the above image data is read out from the disc and the like together with the moving picture data and the still picture data, decoded by a decoding apparatus, temporarily stored in a storage device and then reproduced and displayed on a display apparatus together with a moving picture and a still image. FIG. 6 is a block diagram showing an example of a coded image decoding apparatus. The arrangement and operations of this coded image decoding apparatus will be described with reference to FIG. 1. When the storage medium such as the disc is reproduced, first, a series of code string for the first horizontal line within the block 1 is read out. In the end, a series of code string for the last horizontal line within the block 15 is read out and thereby sequentially expanded by decoding at the horizontal line unit.

To be more concrete, as shown in FIG. 6, in the state in which a line memory (generally constructed as a shift register and its memory capacity is 128×2 bits, for example) 66 is reset, first, a series of code string for the first horizontal line within the block 1 is inputted to a code extracting circuit 61 as compressed color code data. Although the code extracting circuit 61 sequentially extracts codes (codes) with reference to the code book, it extracts the code corresponding to the first run in the beginning. This code contains run-length information and difference information, and the run-length information is set to a run-length counter 63 for controlling the number in which difference data is to be outputted. On the other hand, difference information is set to a transition table 62. In the case of the code corresponding to the first run, the difference data set to the transition table 62 is outputted through a difference output circuit 65 by the amount corresponding to the number of times indicated by the run-length counter 63. The difference data is set to a register 64.

After the code corresponding to the first run has been extracted from the inputted compressed color code data, except for the case of the specific code "100", the code containing the run-length information and the transition type information are sequentially extracted from the inputted compressed color code data. While each time the code is extracted, the run-length information is set to the run-length counter 63, and the transition type information is set to the transition table 62. In the transition table 62, difference information of the extracted code is decoded from the transition type information and the difference information from the register 64 is outputted through the difference output circuit 65 by the number of times indicated by the run-length counter 63. On the other hand, the above difference data is set to the register 64. When the specific code "00" is extracted from the compressed color code data, the difference output from the transition table 62 goes to "00", and this difference data is outputted through the difference output circuit 65 by the amount up to the end pixel of the horizontal line.

On the other hand, concurrently with the above-mentioned decoding of the difference data, an exclusive-OR circuit 67 calculates difference data of 128 bits×2 bits by an exclusive-OR fashion sequentially outputted from the difference output circuit 65 and the data "0" of 128 bits×2 bits sequentially shifted out from the line memory 66 in synchronism with each other, and the exclusive-ORed result is shifted in the line memory 66. As a consequence, a series of code strings corresponding to the first horizontal line within the block 1 is expanded by decoding. In other words, after the color code data on the original first horizontal line has been produced, the reproduced color code data is temporarily stored in an external memory (temporary memory) 6 under control of a memory controller 68.

Thereafter, a series of code strings corresponding to the second horizontal line within the block 1 is serially inputted into the code extracting circuit 61 and processed similarly as described hereinbefore, whereby difference data of 128×2 bits is sequentially outputted from the difference output circuit 65. The thus outputted difference data and the color code data on the original first horizontal line are exclusive-ORed in synchronism with each other, and the exclusive-ORed result is shifted in the line memory 66. Thus, color code data on the original second horizontal line is reproduced and temporarily stored in the external memory 6. Although similar processing will hereinafter be repeated on each of a series of code strings corresponding to the horizontal lines following the third horizontal line within the block 1, at the time in which a series of code strings corresponding to the last horizontal line is processed, the line memory 66 is temporarily reset and then a series of code strings corresponding to the first horizontal line within the block 2 is serially inputted to the code extracting circuit 61 as the compressed code data.

In the end, similar processing is repeated on each of the blocks 1 to 15, whereby the whole of image data is stored in the external memory 6. In some cases, this character information will be read out to the display apparatus later on and may be superimposed upon other moving picture data and still picture data and thereby reproduced and displayed.

Figure 7:
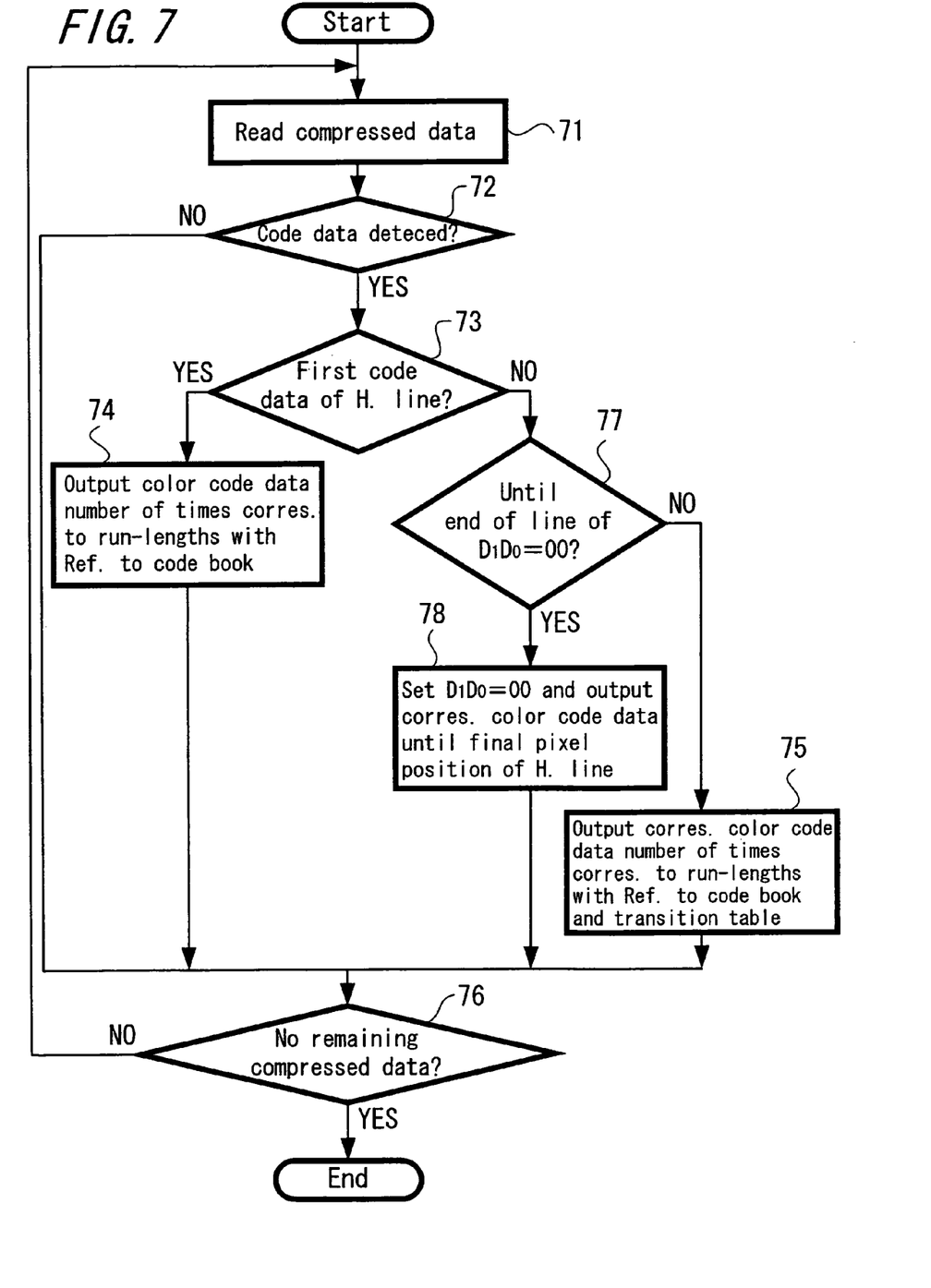
FIG. 7 is a flowchart showing an example of decoding processing in a coded image decoding apparatus according to the present invention.

FIG. 7 is a flowchart showing an example of decoding processing executed on coded character information image data by software processing. According to this flowchart, first, a series of code strings corresponding to the first horizontal line within the block 1 is read out at one bit unit as compressed color code data. Each time a series of code strings is read out, it is determined with reference to the code book whether or not a code (code) is detected (steps 71, 72). If code data is not detected, then it is determined whether or not there exists the compressed color code data on the horizontal line. If the compressed color code data exists, a series of code strings is further read out by one bit (steps 76, 71). Although such processing is repeated and the code data corresponding to the first run is extracted first, for this code data, corresponding color code data is outputted over the number of run-lengths with reference to the code book (steps 72 to 74).

After that, it is determined whether or not there exists compressed color code data on the horizontal line. If it exists, then a series of code strings is further read out by the amount of one bit (steps 76, 71). Such processing is repeated and code data other than the code data corresponding to the first run are sequentially extracted. For these code data, except the specific code "00", corresponding color code data is outputted over the number of run-lengths with reference to the code book and the transition table (steps 73, 75). For the specific code "100", $D_1D_0$="00" is set and corresponding color code data of the amount up to the final pixel of the horizontal line are outputted (steps 77, 78). As such processing is repeated, compressed color code data which are not yet read out on the horizontal line do not exist any more, and hence a series of processing is ended (step 76). The above decoding processing is repeated up to the last horizontal line within the block 15.

While the embodiment of the present invention has been described so far concretely, it is needless to say that the present invention is not limited to the above-described embodiment and that various modifications could be effected therein without departing from the gist of the invention.

The invention claimed is:

1. In an image coding apparatus for an image in which color code data of 2 bits corresponds to each pixel on an image, the image coding apparatus comprising:
   color code difference detecting means for detecting difference data between color code data of opposing pixel positions in divided horizontal lines and adjacent immediately-preceding divided lines with respect to each divided horizontal line within blocks forming an image, each time the blocks of the image equally divided into M (M: an arbitrary integer greater than 1) blocks in the horizontal direction are updated; and
   run-length coding means for run-length coding a coded word corresponding to a first run in a state in which said run contains difference information, except when said run is a special run, and coded words corresponding to runs other than said first run in a state in which said run contains transition type information indicating a type of transition of the difference data of an immediately-preceding run to the difference data of said run instead of difference information of said run, except when said run is a special run, each time difference data corresponding to a divided horizontal line from said color code difference detecting means is run-length coded at every run.

2. The image coding apparatus according to claim 1, wherein said run-length coding means run-length codes a special run in which a coded word corresponding to a run having a length of 1 is set to a shortest constant word length and in which all difference data on divided horizontal lines are continued from a predetermined pixel position to an end pixel position in the form of "00" and a run in which a special coded word corresponding to said special run is set to a constant word length that does not contain difference information and in which all difference data on the divided horizontal lines are continued from a predetermined pixel position to an end pixel position in the form other than "00" and are the same, while said run length coding means run-length codes runs other than said first run and said special run in a state in which transition type information is set to 1 bit when the difference data of the immediately-preceding run is changed into the difference data "00" of said run and said run-length coding means run-length codes runs in a state in which transition type information is set to 2 bits when the difference data of the immediately-preceding run is changed into other difference data than said difference data "00".

3. An image coding method for an image in which color code data of 2 bits corresponds to each pixel on an image, the image coding method comprising:
- a color code difference detecting step for detecting difference data between color code data of opposing pixel positions in divided horizontal lines and adjacent immediately-preceding divided lines with respect to each divided horizontal line within blocks forming an image each time the blocks of the image equally divided into M (M: an arbitrary integer greater than 1) blocks in the horizontal direction are updated; and
- a run-length coding step for run-length coding a coded word corresponding to a first run in a state in which said run contains difference information, except when said run is a special run, and coded words corresponding to runs other than said first run in a state in which said run contains transition type information indicating a type of transition of difference data of an immediately-preceding run to the difference data of said run instead of difference information of said run, except when said run is a special run, each time difference data corresponding to a divided horizontal line from said color code difference detecting means is run-length coded at every run.

4. The image coding method according to claim 3, further comprising run-length coding a special run in which a coded word corresponding to a run having a length of 1 is set to a shortest constant word length and in which all difference data on divided horizontal lines are continued from a predetermined pixel position to an end pixel position in the form of "00" and a run in which a special coded word corresponding to said special run is set to a constant word length that does not contain difference information and in which all difference data on the divided horizontal lines are continued from a certain pixel position to an end pixel position in a form other than "00" and are the same, while said run length coding method run-length codes runs other than said first run and said special run in a state in which transition type information is set to 1 bit when the difference data of the immediately-preceding run is changed into the difference data "00" of said run and said run-length coding means run-length codes runs in a state in which transition type information is set to 2 bits when the difference data of the immediately-preceding run is changed into other difference data than said difference data "00".

5. A coded image decoding apparatus for a coded image run-length coded in which color code data of 2 bits corresponds to each pixel on an image, and in which a color code difference detecting is performed for detecting difference data between color code data of opposing pixel positions in divided horizontal and adjacent immediately-preceding divided lines with respect to each divided horizontal line within blocks forming an image is detected each time blocks of the image equally divided into M (M: an arbitrary integer greater than 1) blocks in the horizontal direction are updated, and a coded word corresponding to a first run is run-length coded in a state in which said run contains difference information, except when said run is a special run, and coded words corresponding to runs other than said first run in a state in which said run contains transition type information indicating a type of the transition of difference data of an immediately-preceding run to the difference data of said run instead of difference information of said run, except when said run is a special run, each time difference data corresponding to a divided horizontal line from said color code difference detecting means is run length coded at every run, the coded image decoding apparatus comprising:
- coded word extracting means for sequentially extracting a coded word from a coded word string corresponding to divided horizontal lines sequentially inputted from an external source; and
- decoding means for decoding the coded word extracted by said coded word extracting means.

6. The coded image decoding apparatus according to claim 5, wherein said decoding means decodes information of difference data corresponding to said coded word based on transition type information contained in said coded word and information of difference data corresponding to an immediately-preceding coded word when coded words other than predetermined coded words corresponding to a first coded word of a divided horizontal line and a special run are decoded.

7. A coded image decoding method for a coded image run-length coded in which color code data of 2 bits corresponds to each pixel on an image, a color code difference detecting step detects difference data between color code data of opposing pixel positions in divided horizontal lines and adjacent immediately-preceding divided lines with respect to each divided horizontal line within blocks forming the image is detected each time blocks of the image equally divided into M (M: an arbitrary integer greater than 1) blocks in the horizontal direction are updated and a coded word corresponding to a first run is run-length coded in a state in which said run contains difference information, except when said run is a special run, and coded words corresponding to runs other than said first run in a state in which said run contains transition type information indicating a type of transition of the difference data of an immediately-preceding run to the difference data of said run instead of difference information of said run, except when said run is a special run, each time difference data corresponding to a divided horizontal line from said color code difference detecting means is run-length coded at every run, the coded image decoding method comprising:
- a coded word extracting step for sequentially extracting a coded word from a coded word string corresponding to divided horizontal lines sequentially inputted from an external source; and
- a decoding step for decoding the coded word extracted by said coded word extracting step.

8. The coded image decoding method according to claim 7, wherein said decoding step decodes information of a difference corresponding to said coded word based on transition type information contained in said coded word and information of difference data corresponding to an immediately-preceding coded word when coded words other than predetermined coded words corresponding to a first coded word of a divided horizontal line and a special run are decoded.

* * * * *

UNITED STATES PATENT AND TRADEMARK OFFICE
CERTIFICATE OF CORRECTION

| | | |
|---|---|---|
| PATENT NO. | : 7,154,420 B2 | Page 1 of 1 |
| APPLICATION NO. | : 10/503957 | |
| DATED | : December 26, 2006 | |
| INVENTOR(S) | : Yoshihiko Deoka and Hideya Muraoka | |

It is certified that error appears in the above-identified patent and that said Letters Patent is hereby corrected as shown below:

In Column 7, Line 67, delete "tran" and insert therefore --transition type information instead of--.

Signed and Sealed this

Thirteenth Day of November, 2007

JON W. DUDAS
*Director of the United States Patent and Trademark Office*